(12) United States Patent
Boyer et al.

(10) Patent No.: US 6,412,249 B1
(45) Date of Patent: Jul. 2, 2002

(54) WALL STUD

(75) Inventors: Robert W. Boyer; James R. Bond, both of Newton, IA (US)

(73) Assignee: Boyer Building Products, Inc., Newton, IA (US)

( * ) Notice: Subject to any disclaimer, the term of this patent is extended or adjusted under 35 U.S.C. 154(b) by 0 days.

(21) Appl. No.: 09/396,117

(22) Filed: Sep. 14, 1999

Related U.S. Application Data (63) Continuation of application No. 09/035,226, filed on Mar. 5, 1998, which is a continuation-in-part of application No. 08/813,695, filed on Mar. 7, 1997, now abandoned, which is a continuation of application No. 08/544,336, filed on Oct. 17, 1995, now Pat. No. 5,609,006.

(51) Int. Cl.[7] .............................................. E04C 3/30
(52) U.S. Cl. ...................................... 52/731.9; 52/731.8
(58) Field of Search ................................ 52/309.7, 376, 52/731.9, 731.5, 729.2, 694, 730.7, 731.6, 731.8, 737.3, 690, 693, 695, 696, 733.2, 733.3

(56) References Cited

U.S. PATENT DOCUMENTS

| | | | |
|---|---|---|---|
| 1,959,135 A | 5/1934 | Miller ........................... 72/115 |
| 2,169,253 A | 8/1939 | Kotrbaty .................... 52/729.2 |
| 2,252,956 A | 8/1941 | Adler ........................... 189/40 |
| 2,718,289 A | 9/1955 | Collins ......................... 189/34 |
| 3,179,983 A | 4/1965 | Webber et al. ................ 20/0.5 |
| 3,282,005 A | 11/1966 | Dirdwell ....................... 52/364 |
| 3,531,901 A | 10/1970 | Will, Jr. et al. ............... 52/309 |
| 3,535,844 A | 10/1970 | Glaros ......................... 52/595 |
| 3,797,190 A | 3/1974 | Widdowson ................. 52/595 |
| 3,960,637 A | 6/1976 | Ostrow ....................... 52/729.2 |
| 4,038,802 A | 8/1977 | Bajorek et al. ............... 52/731 |
| 4,223,500 A | 9/1980 | Clark et al. ................ 52/309.4 |
| 4,409,768 A | 10/1983 | Boden ......................... 52/309 |
| 4,471,592 A * | 9/1984 | MacKinnon, Jr. et al. .... 52/404 |
| 4,641,468 A | 2/1987 | Slater ......................... 52/309.4 |
| 4,653,242 A | 3/1987 | Ezard .......................... 52/727 |
| 4,674,250 A | 6/1987 | Altizer ...................... 52/309.7 |
| 4,676,469 A | 6/1987 | Rotermund et al. ........ 52/729.2 |
| 4,795,666 A | 1/1989 | Okada et al. ................. 425/71 |
| 4,852,322 A * | 8/1989 | McDermid ................... 52/404 |
| 4,854,096 A | 8/1989 | Smolik ........................ 52/241 |
| 4,941,304 A | 7/1990 | Lewellin ...................... 52/580 |
| 4,949,518 A | 8/1990 | Nagel et al. .................. 52/239 |
| 5,249,401 A | 10/1993 | Schmid ........................ 52/503 |
| 5,323,584 A | 6/1994 | Scarlett ..................... 52/730.7 |
| 5,394,665 A | 3/1995 | Johnson ...................... 52/241 |
| 5,452,556 A * | 9/1995 | Taylor ....................... 52/730.7 |
| 5,464,302 A | 11/1995 | Menchetti ................... 403/335 |
| 5,497,591 A * | 3/1996 | Nelson ...................... 52/481.1 |
| 5,519,978 A | 5/1996 | Scato et al. ................. 52/31.9 |
| 5,590,505 A * | 1/1997 | Bogle ........................ 52/731.9 |
| 5,596,859 A * | 1/1997 | Horton et al. .............. 52/733.3 |

(List continued on next page.)

FOREIGN PATENT DOCUMENTS

GB 569892 6/1945 ............ 52/731.1 X

OTHER PUBLICATIONS

USG Drywall/Steel Framed Systems; System Folder SA-923; Jan. 1989 United States Gypsum Company, Chicago, Illinois 60606-4385.

*Primary Examiner*—Curtis A. Cohen
(74) *Attorney, Agent, or Firm*—Zarley, McKee, Thomte, Voorhees & Sease, P.L.C.

(57) ABSTRACT

A wall stud utilized in framing structures, the wall stud including C-shaped frame members supported by core elements. The walls studs can be aligned and secured in a track mounted adjacent the top and bottom ends of the wall studs. The wall studs provide good insulation, support, and easy access for the installation of electrical and plumbing equipment.

12 Claims, 11 Drawing Sheets

U.S. PATENT DOCUMENTS 5,609,006 A * 3/1997 Boyer ........................ 52/731.9
5,625,997 A * 5/1997 Callahan et al. ............ 52/737.3
5,875,605 A * 3/1999 Rudd ......................... 52/731.8
5,881,529 A * 3/1999 Rudd ......................... 52/737.3
6,061,995 A * 5/2000 Menchetti et al. .......... 52/794.1
6,119,430 A * 9/2000 Nicholls ..................... 52/733.2
6,134,859 A * 10/2000 Rudd ......................... 52/737.3

* cited by examiner

WALL STUD

CROSS REFERENCE TO RELATED APPLICATIONS

This is a continuation of Ser. No. 09/035,226 which was filed on Mar. 5, 1998, which is a continuation-in-part of Ser. No. 08/813,695 which was filed Mar. 7, 1997, now abandoned which was a continuation of Ser. No. 08/544,336 filed Oct. 17, 1995 and issued Mar. 3, 1997 as U.S. Pat. No. 5,609,006.

BACKGROUND OF THE INVENTION

The present invention relates to wall studs generally replacing wooden studs utilized in framing structures such as houses.

Wooden studs are common in the construction industry. For many years, lumber was plentiful and inexpensive. Over the years, however, the supply of lumber has diminished. Consequently, lumber is more expensive and good quality lumber suitable for wall studs is more scarce.

Furthermore, traditional wood studs are not always the desired material in all applications. For example, fire resistant housing is essential in many areas. Traditional wood studs are also undesirable in areas infected with termites. In addition, it is difficult to run electrical wires and plumbing equipment through walls having solid wooden studs. Designing around these studs can be time consuming and expensive.

Previous attempts to design a substitute for wooden studs have been unsuccessful. As with wooden studs, it is difficult to install electrical and plumbing equipment through solid metal studs. Modifying such wall studs is time consuming and can cause structural defects. Because metal is a good conductor of heat, prior art metal studs are also poor insulators. Finally, prior art metal studs are not easily adapted to accommodate electrical outlets and switches and carpenters cannot use nails and screws for adapting the studs in woodwork and molding applications.

Therefore, the primary objective of the present invention is the provision of an improved wall stud.

A further objective of the present invention is the provision of an improved wall stud that is a good insulator.

Another objective of the present invention is the provision of an improved wall stud that provides for the easy installation of electrical and plumbing equipment.

A further objective of the present invention is an improved wall stud that is suitable for use with carpenter's nails and screws.

Another objective of this invention is the provision of a wall stud which can utilize cost efficient sold wood substitutes, such as oriented strand board (OSB).

A further objective of the present invention is the provision of an improved wall stud which is efficient in operation, economical in manufacture, and durable in use.

SUMMARY OF THE INVENTION

The foregoing objectives are achieved in the preferred embodiment of the invention, by an elongated wall stud mounted in a vertical position. The wall stud is comprised of two elongated C-shaped frame members, a top core element positioned within the cavity formed by the frame members toward the top end of the stud, and a bottom core element similarly positioned within the cavity between the frame members toward the bottom end of the stud. The core elements are rigid and accept nails and screws.

If the wall studs are utilized in framing an outside wall, the embodiment of the invention may include an insulative material positioned within the cavity between the frame members and between the top and bottom core elements. Metal by itself is a good conductor of heat and is therefore a poor insulator. Incorporating an insulative material such as polyurethane or oriented strand board into the stud provides good insulation for outside walls. In addition, the insulative material reinforces the wall stud to ensure that the stud maintains its structural integrity when placed under large loads in outside wall applications.

For inside walls, the invention may include additional core elements spaced apart between the top and the bottom end of the stud. These core elements are slidably mounted between the frame members and can easily be adjusted to a desired height to accommodate electrical outlets and switches. A substantial portion of the cavity remains hollow, allowing pipes and electrical wiring to be easily installed in the wall.

The core elements are particularly well suited for accepting carpenters nails and screws. As a result, carpenters can interchange wall studs of the present invention and wooden wall studs. A core element made from polyethylene is strong and does not split when deformed or compressed. To frame the stud, a U-shaped track is provided for aligning the studs and securing them to either the top or bottom structural surface.

As an alternative, a user with traditional building needs may wish to utilize a more traditional approach. An alternative embodiment uses only wood and steel, but benefits both economically and structurally by using a reinforced oriented strand board. This embodiment achieves all the insulative and structural benefits of wood, but because the care of oriented strand board may be thinner, it is cost effective. Further, by using OSB, the problems of new growth wood now used in traditional studs are avoided.

DETAILED DESCRIPTION OF THE PREFERRED EMBODIMENT

Figure 1:
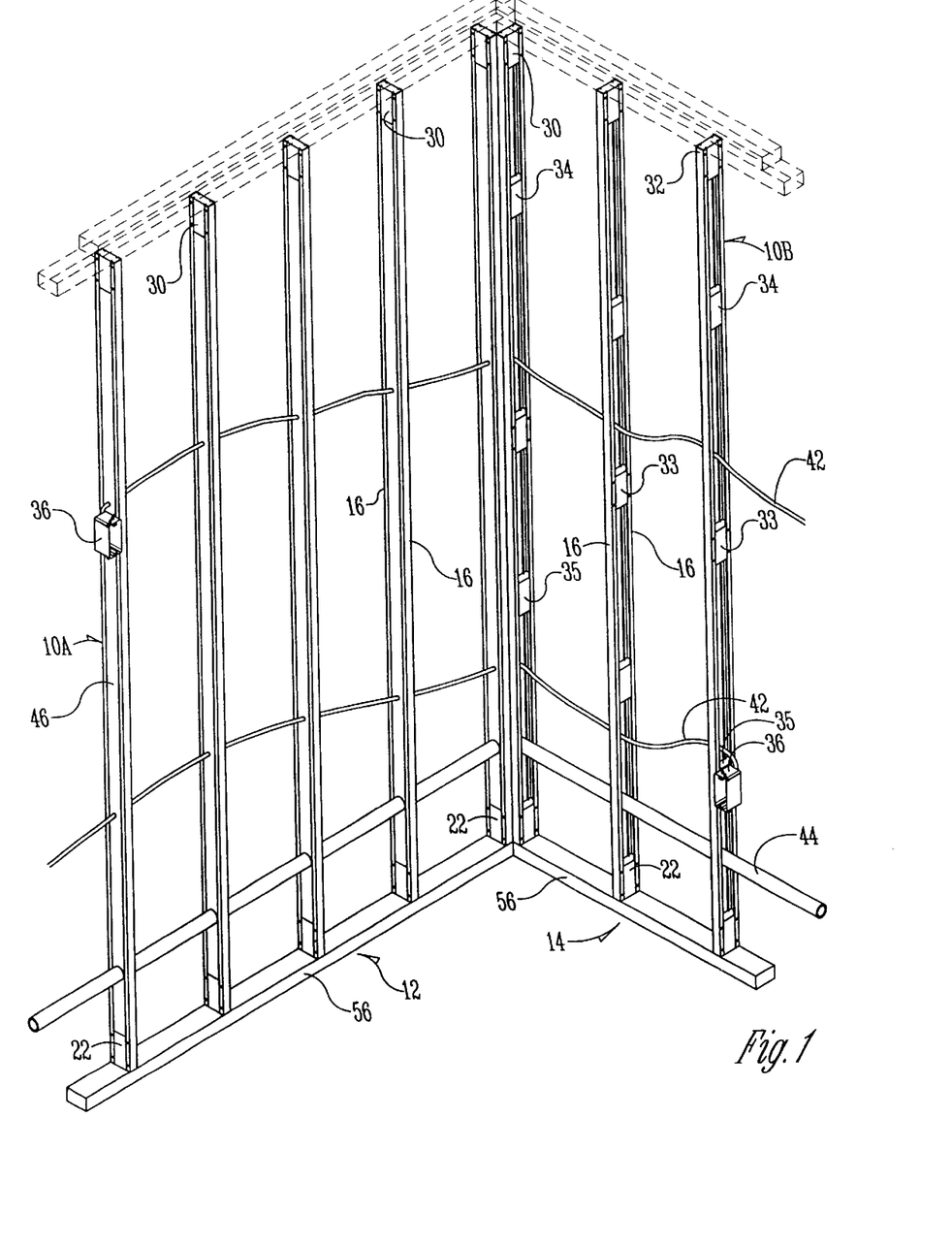
FIG. 1 is a perspective view of the preferred embodiment of the wall stud showing the wall stud used in framing outside and inside walls.
Figure 2:
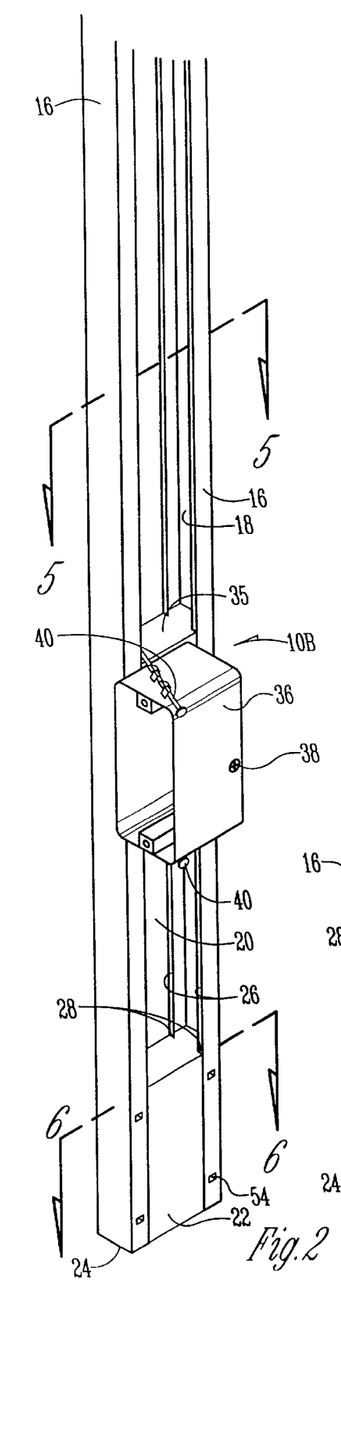
FIG. 2 is a perspective view of the wall stud of FIG. 1.

FIG. 1 shows a plurality of wall studs 10A and 10B used in framing an outside wall 12 and an inside wall 14, respectively. The wall stud 10B used in framing the inside wall 14, has two elongated C-shaped frame members 16. Each frame member 16 has an inside surface 18. The inside surfaces are spaced apart and facing to form an internal cavity 20.

A bottom core element 22 is positioned within the cavity 20 at the bottom end 24 of the wall studs 10A and 10B. The inner surfaces 18 of the frame members 16 partially enclose the bottom core element 22. To ensure that the frame members 16 do not separate from the bottom core element 22, keepers 26 on each frame member 16 extend inward and ride between slits 28 in the bottom core element 22. The top core element 30 is similarly constructed and positioned between frame members 16 at the top end 32 of the wall studs 10A and 10B.

A center core element 33 is positioned in the center of the stud 10B within the cavity 20. Additional core elements 34 and 35 are positioned within the cavity 20 between the top core element 30 and the center core element 33 and between the center core element 33 and the bottom core element 22, respectively. Center core element 33 and additional core elements 34 and 35 give the wall stud 10B additional support and also provide a structure for mounting electrical boxes 36.

Figures 3, 4:
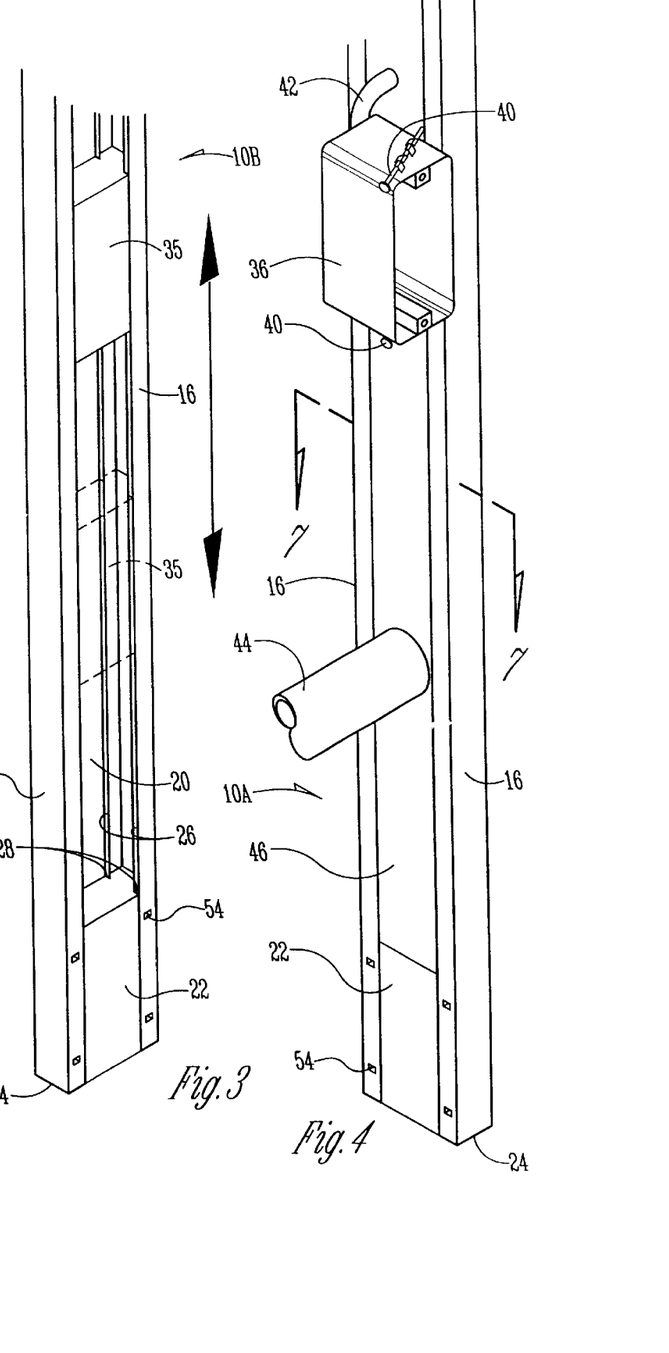
FIG. 3 is a perspective view of the wall stud of FIG. 1 showing a core element slidably mounted.
FIG. 4 is a perspective view of the wall stud showing insulative material stored within the cavity of the wall stud.
Figure 4:
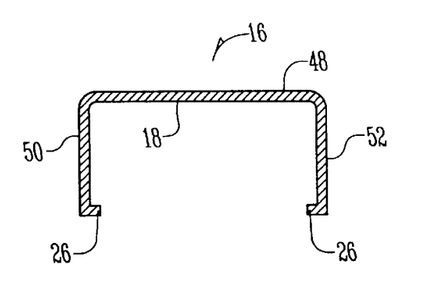

The electrical box 36 is used to house such things as electrical switches and electrical outlets. The electrical box 36 attaches to the core elements 33, 34, and 35 in a variety of ways. Preferably, the electrical box 36 is glued to the core elements. Screws 38 and/or nails 40 can also be used. Although the center core element 33 is fixed in position along the wall stud 10B, additional core elements 34 and 35 are left slidably mounted. Thus, the electrical box 36 can be easily adjusted to different heights along the wall stud 10B by sliding the additional core elements 34 and 35 either up or down the wall stud (see FIG. 3).

Although the core elements 22, 30, 33, 34, and 35 can be made from a variety of materials such as wood, polyethylene is the preferred material. Polyethylene will not crack when screws and nails are inserted into the core element. Further, polyethylene is a fire resistant and strong material.

Because the wall studs 10A and 10B are designed to facilitate the use of carpenter's nails and screws, a carpenter can easily interchange studs 10A and 10B and wooden studs. This is particularly important in customized window and door applications where wooden studs are often preferred.

For outside wall applications, a substantial portion of the cavity 20 in the wall stud 10A is hollow. As a result, electrical wiring 42 and pipe 44 are easily inserted and installed inside the cavity 20.

The wall stud 10A used in outside wall applications is similar to the wall stud 10B used in inside wall applications. The top and bottom core elements 30 and 22 are positioned at the ends of the wall stud 10A. In framing an outside wall, it is desirable that the wall be a good insulator. Thus, wall studs 10A also contain an insulative material 46 positioned within the cavity 20 between the top core element 30 and the bottom core element 22. A variety of insulative materials can be used. The preferred material, however, is polyurethane. Polyethylene has an R-factor of approximately 7, more than three times that of wood. Furthermore, when wood absorbs moisture, its insulating factor is even lower.

In addition to providing good insulation, outside walls must also be able to support large loads. Polyurethane is a strong material and inserting polyurethane into the cavity 20 of the wall stud 10A reinforced the stud and ensures that the stud maintains its structural integrity.

Polyurethane and other insulative materials can easily be cut and shaped to provide access for electrical wires 42 and pipe 44. The electrical box 36 can be mounted to the insulating material 46 using glue, nails, screws, and the like, or any combination.

Figure 5:
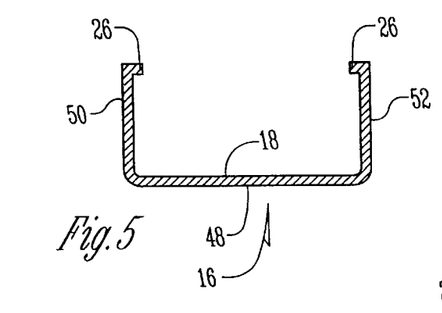
FIG. 5 is a sectional view taken along line 5—5 of FIG. 2.
Figure 6:
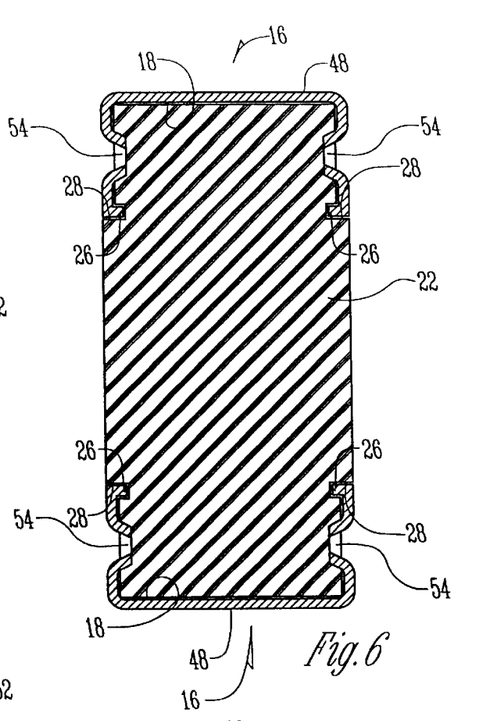
FIG. 6 is a sectional view taken along line 6—6 of FIG. 2.
Figure 7:
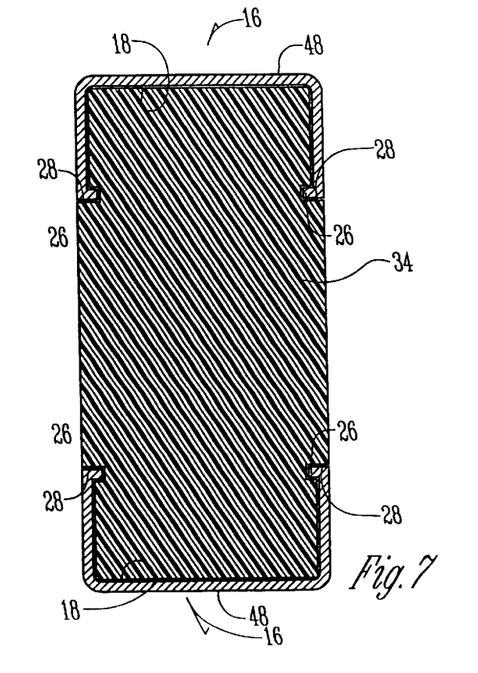
FIG. 7 is a sectional view taken along line 7—7 of FIG. 4.

FIG. 5 is a sectional view of the frame members 16. Each frame member has a back wall 48, side walls 50 and 52, and keepers 26. The inside surfaces 18 of the frame members 16 partially enclose the core elements 22, 30, 33, 34, and 35 and the insulative material 46 (see FIGS. 6 and 7). The preferred material for the frame members 16 is galvanized steel.

It is relatively inexpensive to increase the size of the wall studs 10A and 10B from, for example, a 2×4 to a 2×8. The same frame members 16 and only slightly larger core elements and insulative material are used. In contrast, increasing the size of a wooden stud results in a significant additional cost.

Once center core element 33 is slid into position in the center of the wall stud 10B, the center core element 33 is secured by punching through side walls 50 and 52 of the frame members 16. The resulting punch 54 secures the center core element 33 along the wall stud 10B. Using a punch to secure the center core element 33 is only one means of securing the core element along the stud 10B. Top and bottom core elements 22 and 30 are similarly secured at the top end 32 and bottom end 24 of the wall stud 10A and 10B, respectively. Additional core elements 34 and 35 are left slidably mounted along the wall stud 10B so they can be easily adjusted in height to accommodate electrical boxes 36.

Figure 8:
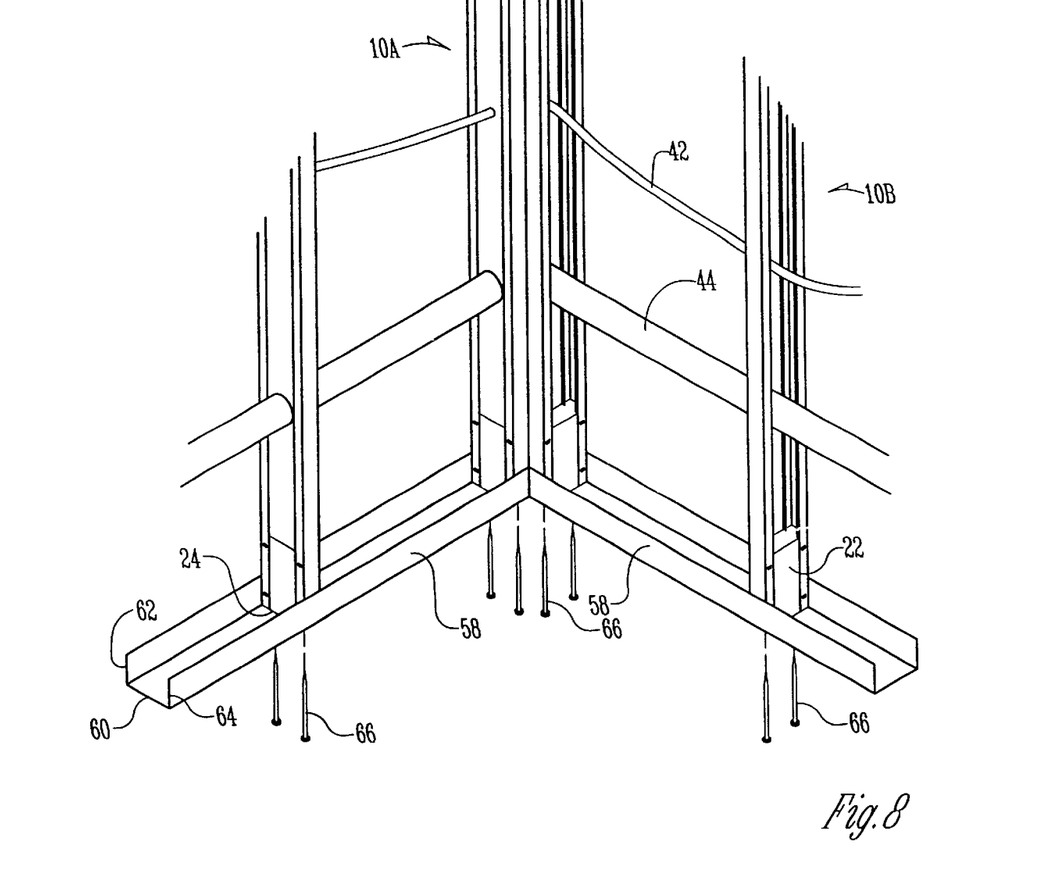
FIG. 8 is a partial perspective view showing wall studs used to frame an outside wall and an inside wall mounted to a lower track.

As shown in FIG. 1, the top and bottom core elements 22 and 30 of the wall studs 10A and 10B can be nailed or screwed to wooden plates 56. This represents a significant advantage over prior art metal studs that cannot easily be attached to wood. Although the embodiment as shown in FIG. 1 works well in a variety of appplications, there are many instances in which wood is not the desired material. An alternative means of mounting the studs 10A and 10B is shown in FIG. 8. The wall studs 10A and 10B are positioned in a lower U-shaped track 58. The lower track 58 is made of galvanized steel or similar material.

The lower track 58 has a back wall 60 and side walls 62 and 64 projecting upward. The bottom end 24 of the wall studs 10A and 10B abuts the back wall 60. The side walls 50 and 52 of the frame members 16 fit against the side walls 62 and 64 of the lower track 58. Nails or screws 66 are inserted through the back wall 60 and into the bottom core element 22 to secure the wall stud 10A or 10B in the lower track 58. Similarly, a screw or nail 66 can be inserted from the bottom core element 22 and into the back wall 60. The lower track 58 can be secured to the foundation using a variety of attachment mechanisms.

Note that wooden studs, in addition to wall studs 10A and B, can also be easily mounted in the lower track 58. Consequently, the same lower track 58 can be used with a wall consisting of both wooden studs and wall studs 10A and 10B.

Replacing the customarily used wooden plate 56 with a metal lower track 58 has many advantages. The metal lower track 58 is fire resistant, resilient, and light weight. In areas where termites are especially troublesome, replacing wood with metal also prolongs the life of the wall.

Similarly, an upper track can also be used to align and position the wall studs 10A and 10B at their top ends 32.

Figure 9:
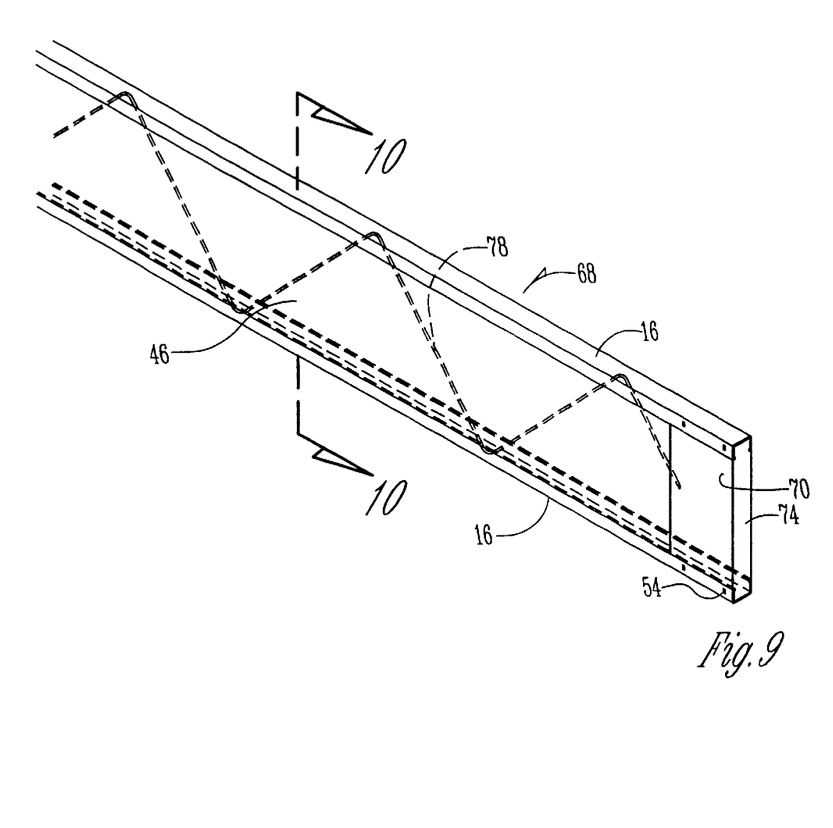
FIG. 9 is a partial perspective view showing an alternative embodiment of the invention.

As previously stated, it is particularly important that wall studs 10A used in outside wall applications be able to support large loads. As the studs increase in size, additional support is often desired to withstand twisting and bending forces. This is particularly important when the design of the present invention is rotated and used as a joist. FIG. 9 illustrates an alternative embodiment of the invention. Except as described below, the structural member 68 is identical to the wall stud 10A. Because the structural member 68 may be rotated to a horizontal position in operation, top and bottom core elements 30 and 22 are now referred to as the first and second core elements 70 and 72 (not shown), respectfully. Similarly, the top and bottom ends 32 and 24 of the frame members 16 are referred to as the first and second ends 74 and 76 (not shown).

Figure 10:
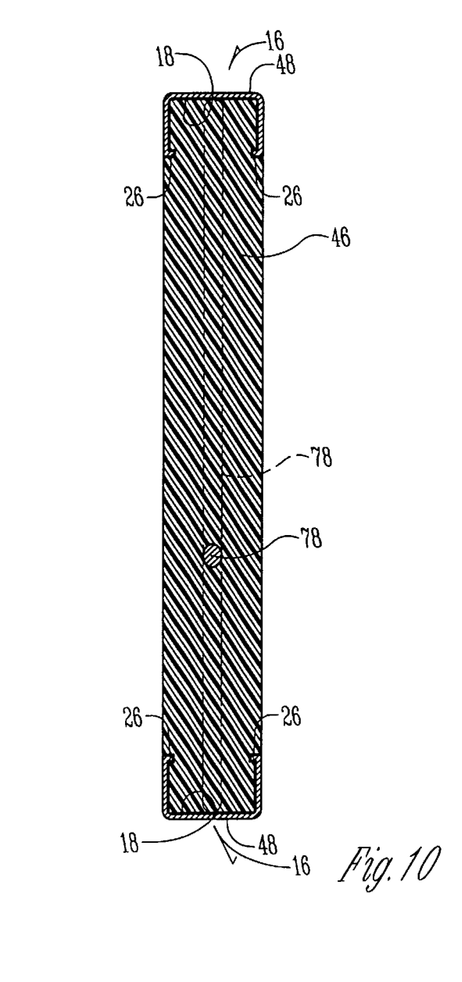
FIG. 10 is a sectional view taken along line 10—10 of FIG. 9.

The insulative material 46 is reinforced with a truss 78 that extends along the longitudinal axis of the frame members 16 within the cavity 20 between the frame members. The truss 78 is immersed within the insulative material 46 (see FIG. 10). Molding the insulative material 46 around the truss 78 reinforces the insulative material, which in turn reinforces the structural member 68. This enables the structural member 68 to withstand large twisting and bending forces. The preferred material for the truss 78 is metal.

Figure 11:
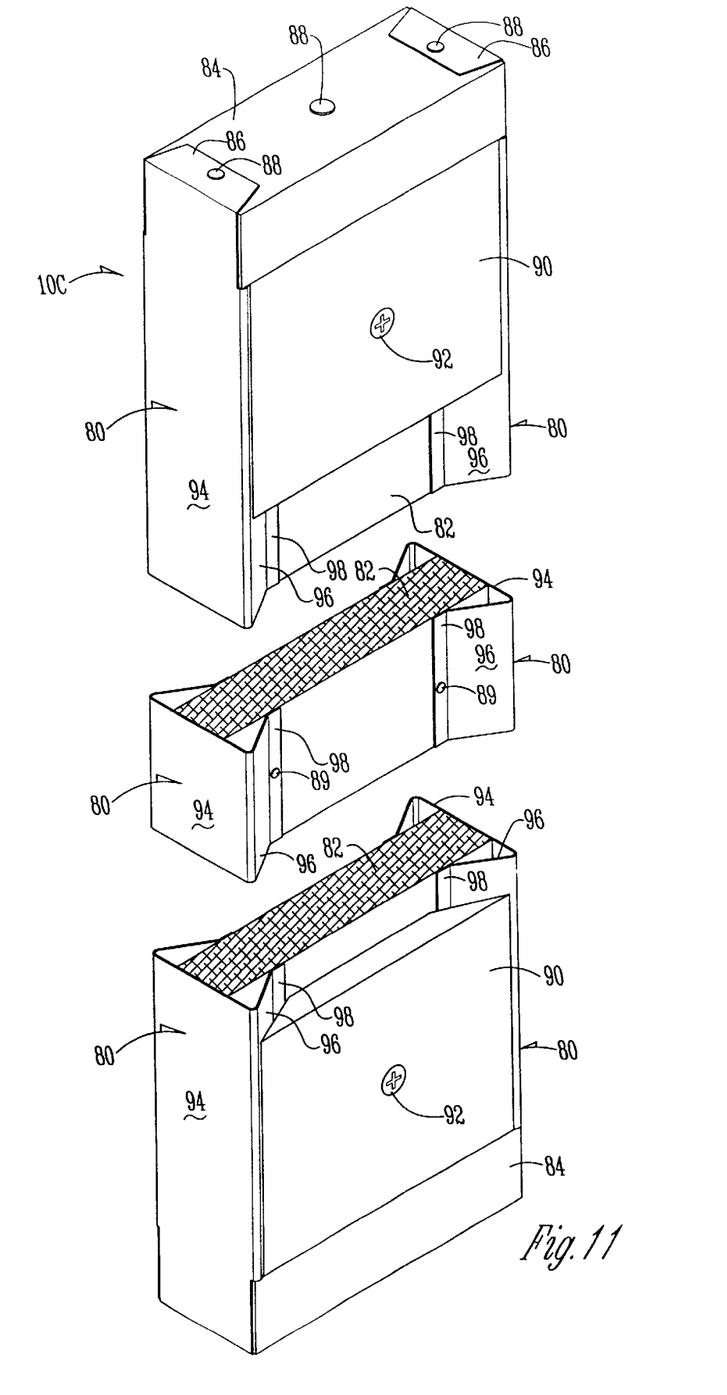
FIG. 11 is an exploded and partial sectional view of an alternative embodiment of the invention.
Figure 12:
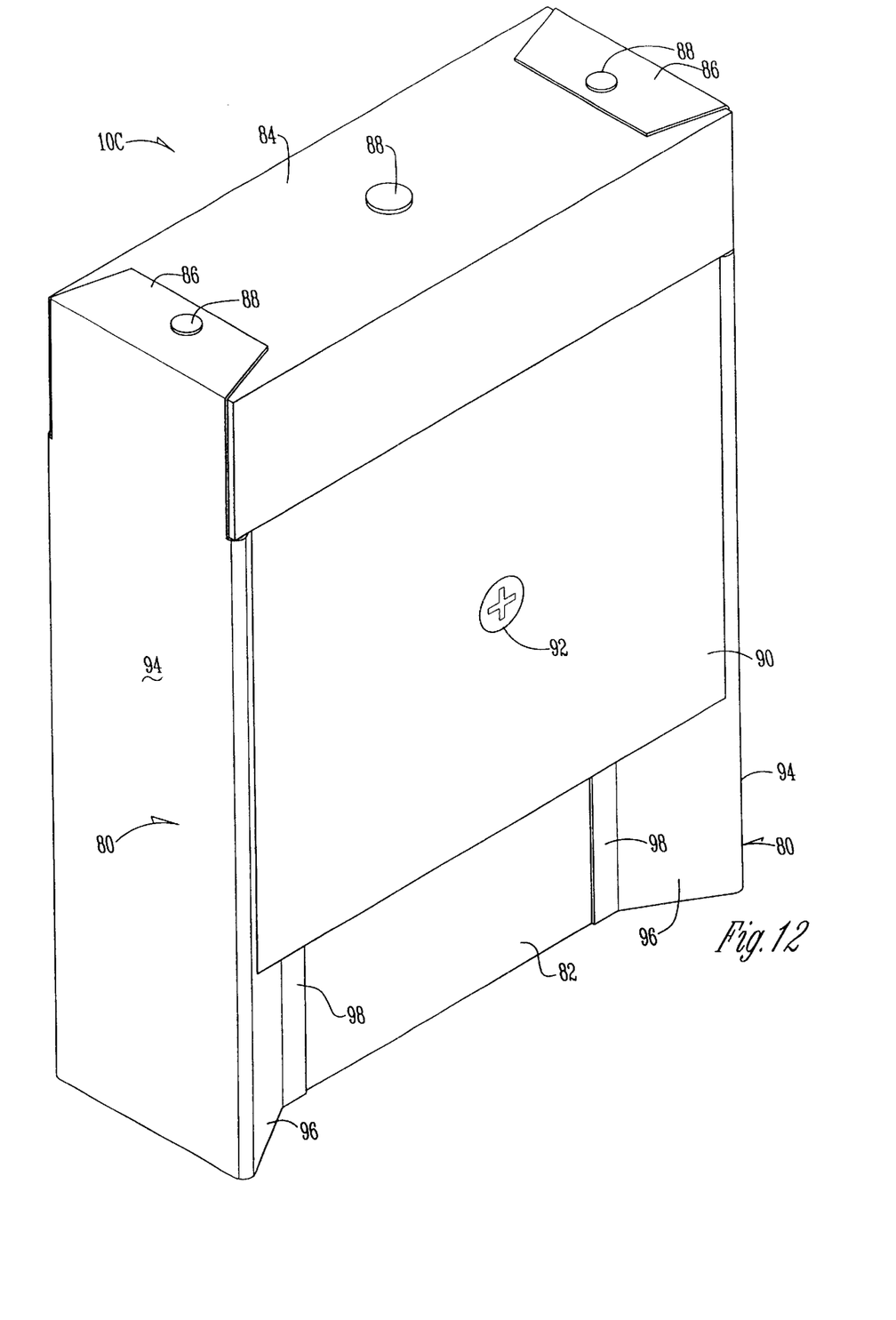
FIG. 12 is a perspective view of one end of the invention.

FIGS. 11 shows another embodiment of wall stud 10C which, like wall studs 10A and 10B can be used in framing either an outside wall 12 or an inside wall 14. The wall stud 10C has two elongated generally C-shaped frame members 16, and due to the unique shape of the channels 80, varying depths of core material 82 can be utilized. The preferred material for the core 82 is OSB, or oriented strand board. For example, FIG. 11 shows a core material 82 which is approximately half the depth of a traditional wall stud. However, given the additional strength added by the channels 16, the improved wall stud of the present invention has equal or greater strength. Further, oriented strand board is more cost efficient than traditional wooden studs and can be impregnated with fire and insect resistant chemicals or additives. It also is much less likely to warp than current new growth wood studs.

The C-shaped channels 80 extend substantially the entire length of the wall stud 10C. A wooden cap 84 can be placed at either end of the core material 82 and can be mounted by screws, nails, adhesives, and the like to provide a solid base. C-shaped channels 80 are provided with a lip 86 for additional support of the cap 84 when mounted on the core material 82. As shown in FIG. 11, cap 84 is secured to the core material 82 by a nail 88 or rivet 89. Likewise lip 86 is attached to cap 84 by a nail or rivet 89. A filler 90 or wooden level which approximates the shape of the space between the two C-shaped channels can also be added at the ends of the wall stud 10C to provide a generally traditional wall stud cross section. A similar filler 90 is placed on the opposite side and can be mounted to core material 82 by screw 92. C-shaped channel 80 can be mounted to core material 82 through the use of nails or rivets 89, or by use of adhesive or epoxy.

Figure 13:
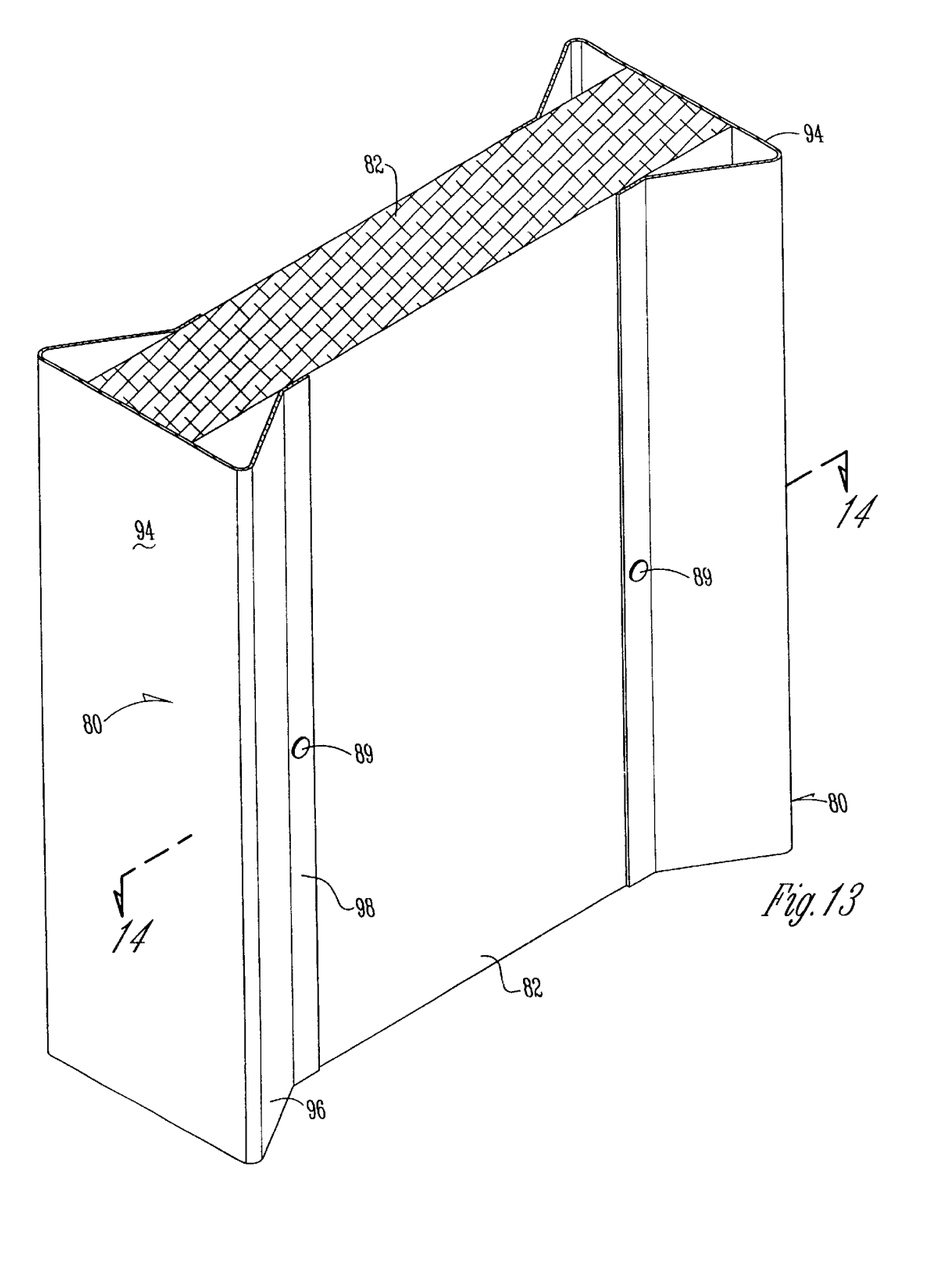
FIG. 13 is a perspective, sectional view of the invention.
Figure 14:
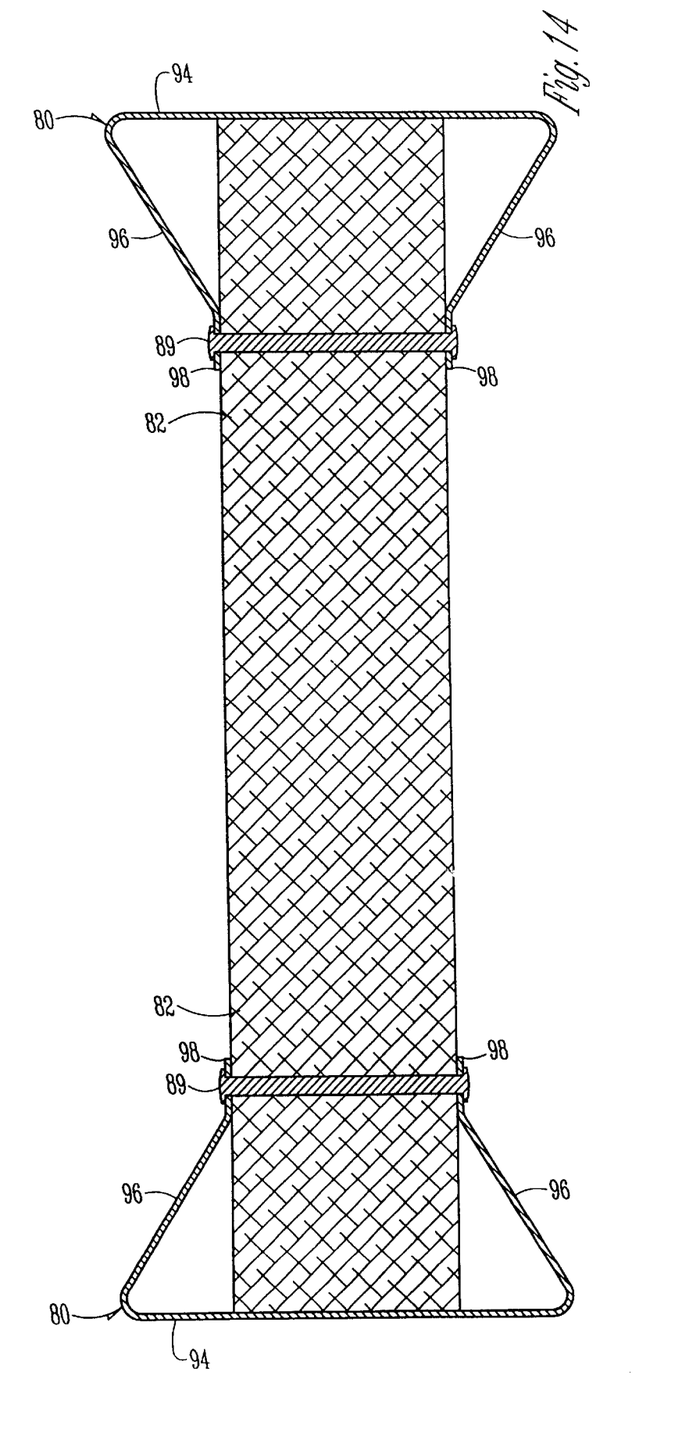
FIG. 14 is a sectional view taken along line 14—14 of FIG. 13.
Figure 17:
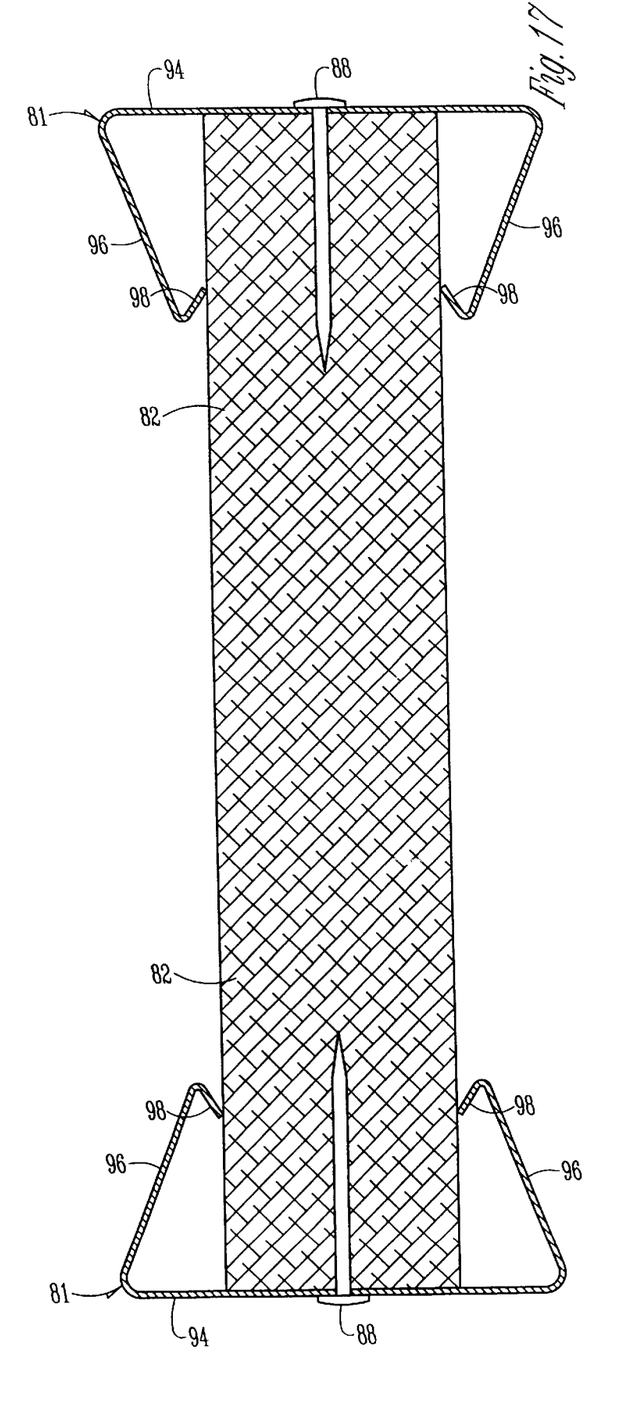
FIG. 17 is a sectional view of another embodiment of the invention.

As best shown in the FIG. 14, C-shaped channel 80 has an external side 94 which runs generally perpendicular to the core material 82. This external side 94 is preferably the standard width of a wall stud, but can be varying sizes depending on the needs of the user. Diagonal portions 96 extend from the external side 94 toward the core material 82. Flange 98 extends from the diagonal portion 96 of the C-shaped channel 80 and is used to hold the core material 82 in place or to attach the channel 80 to the core material 82. Flange 98 can extend away from the external side 94 of the C-shaped channel 80 as shown in FIG. 13 or can extend inwardly as shown in FIGS. 14 and 17. As mentioned above, rivet 89 extends through flange 90 to attach channel 80 to the core material 82. In addition, an adhesive or epoxy (not shown) can be used on the surface of flange 98 closest to core material 82 in addition to, or in lieu of, rivet 89.

As with the previous embodiments, the core material 82 may be provided with passages 100 for electrical wiring, plumbing, and the like.

Figure 15:
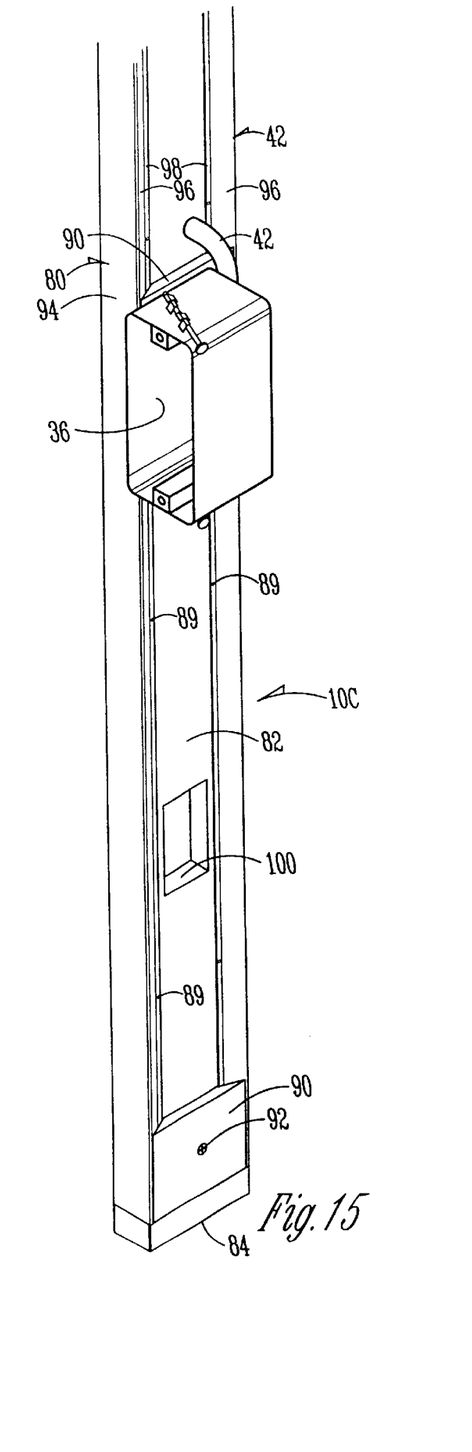
FIG. 15 is a partial perspective view showing a wall stud with a circuit box mounted thereto.
Figure 16:
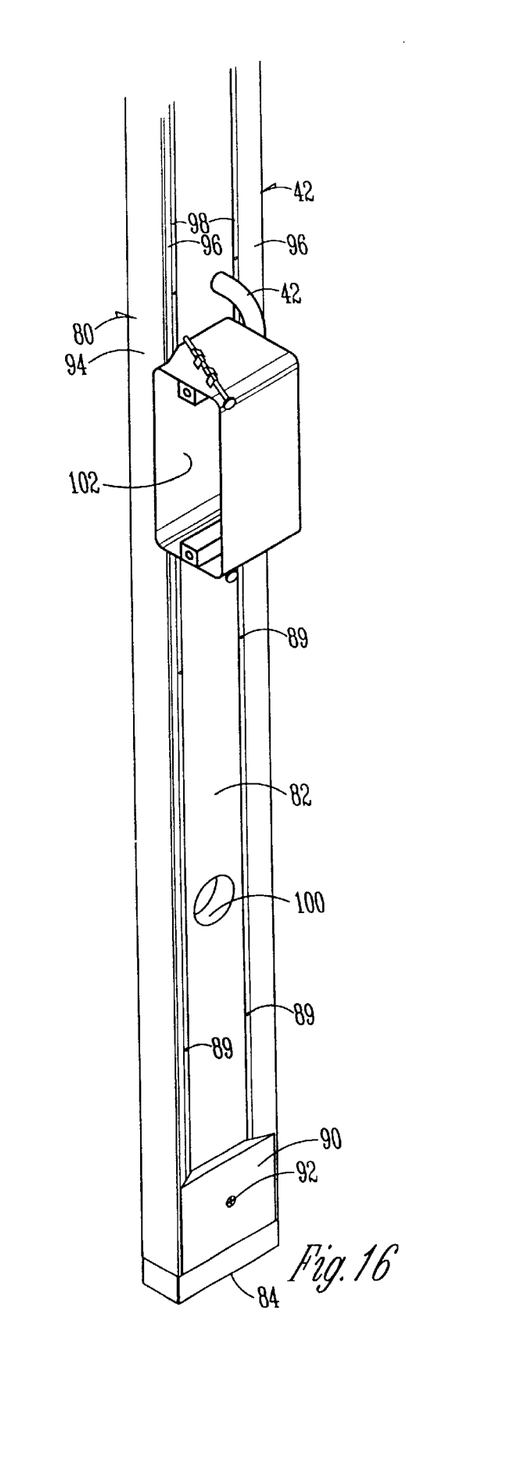
FIG. 16 is a partial perspective view showing a wall stud with a formed circuit box attached thereto.

In addition, circuit boxes 36 may be mounted on fillers 90 as found at the ends of the stud 10C and as shown in FIG. 15. In addition, circuit boxes and other attachment can be molded to specifically fit the angle of the channel 80 as shown in FIG. 16.

The embodiments of the present invention have been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A wall stud for use in framing structures such as houses and buildings, the wall stud comprising:
   two elongated metal channels wherein the channels each have a lip;
   an end piece fixed between the channels at each end of the wall stud, the end piece having at least one outer surface and a bottom surface in contact with the channels, the lips of each channel being connected the outer surface and
   a rigid framework connected to and extending between the metal channels and extending between the end pieces.

2. The wall stud of claim 1 wherein the channels are generally C-shaped.

3. The wall stud of claim 2 wherein the channels each have an external portion, two connecting portions extending from each side of the external portion, and a flange extending from each connecting portion.

4. The wall stud of claim 3 wherein each flange engages the rigid framework.

5. The wall stud of claim 2 further comprising insulation material fixed between the metal channels.

6. The wall stud of claim 5 wherein the rigid framework is substantially contained within the insulation material.

7. The wall stud of claim 6 wherein the insulative material substantially fills an area defined between the metal channels and the end pieces.

8. The wall stud of claim 1 wherein the endpiece comprises wood.

9. The wall stud of claim 1 wherein the rigid framework comprises oriented strand board.

10. The wall stud of claim 1 further comprising a filler attached to the rigid framework.

11. The wall stud of claim 10 wherein the filler substantially fills the space between the two channels and the rigid framework.

12. A wall frame comprising a plurality of wall studs as described in claim 1.

* * * * *